United States Patent
Moyes

(10) Patent No.: US 6,312,540 B1
(45) Date of Patent: Nov. 6, 2001

(54) METHOD OF MANUFACTURING A MOLDED DOOR SKIN FROM A FLAT WOOD COMPOSITE, DOOR SKIN PRODUCED THEREFROM, AND DOOR MANUFACTURED THEREWITH

(75) Inventor: Hartley Moyes, West Yorkshire (GB)

(73) Assignee: MDF, Inc., Fort Lauderdale, FL (US)

( * ) Notice: Subject to any disclaimer, the term of this patent is extended or adjusted under 35 U.S.C. 154(b) by 0 days.

(21) Appl. No.: 09/229,897

(22) Filed: Jan. 14, 1999

(30) Foreign Application Priority Data

Jul. 29, 1998 (GB) ................................................ 9816534

(51) Int. Cl.[7] .................................................... B32B 31/12
(52) U.S. Cl. ........................... 156/87; 156/219; 156/245; 156/307.3; 264/119; 264/322
(58) Field of Search ............................. 52/784.1, 784.16; 264/119, DIG. 65, 86, 87, 102, 284, 293, 320, 322; 156/87, 286, 382, 219, 228, 245, 285, 307.3

(56) References Cited

U.S. PATENT DOCUMENTS

| | | | |
|---|---|---|---|
| 3,112,243 | 11/1963 | Egerstrand | 162/225 |
| 4,007,076 | 2/1977 | Clarke et al. | 156/62.8 |
| 4,146,662 | 3/1979 | Eggers et al. | 428/68 |
| 4,236,365 | 12/1980 | Wheeler | 52/455 |
| 4,265,067 | 5/1981 | Palmer | 52/309.9 |
| 4,277,428 | 7/1981 | Luck et al. | 264/118 |
| 4,301,187 | 11/1981 | Burch | 427/45.1 |
| 4,517,147 | 5/1985 | Taylor et al. | 264/83 |
| 4,606,388 | 8/1986 | Favot | 144/361 |
| 4,684,489 | 8/1987 | Walter | 264/101 |
| 4,828,004 | 5/1989 | Martinez et al. | 160/229.1 |
| 4,830,929 | 5/1989 | Ikeda et al. | 428/542.8 |
| 4,844,968 | 7/1989 | Persson et al. | 428/181 |
| 5,000,673 | 3/1991 | Bach et al. | 425/396 |
| 5,085,891 | 2/1992 | Evans | 427/277 |
| 5,183,622 | 2/1993 | Persson | 264/320 |
| 5,219,634 | 6/1993 | Aufderhaar | 428/156 |
| 5,306,539 | 4/1994 | Clarke et al. | 428/156 |
| 5,505,772 | 4/1996 | Kharazipour et al. | 106/163.1 |
| 5,782,055 | 7/1998 | Crittenden | 52/784.1 |

FOREIGN PATENT DOCUMENTS

| | | |
|---|---|---|
| 0420831 | 4/1991 | (EP) . |
| 0688639 | 12/1995 | (EP) . |
| 454073 | 9/1936 | (GB) . |
| 1154241 | 6/1969 | (GB) . |
| 1420244 | 1/1976 | (GB) . |
| 2237531 | 5/1991 | (GB) . |
| 2276902 | 10/1994 | (GB) . |
| 2306541 | 5/1997 | (GB) . |
| 2324061 | 10/1998 | (GB) . |
| 8705955 | 10/1987 | (WO) . |
| 8702407 | 12/1995 | (WO) . |
| 9603262 | 2/1996 | (WO) . |

OTHER PUBLICATIONS

PCT International Search Report PCT/US98/07003.

Primary Examiner—Michael W. Ball
Assistant Examiner—Gladys Piazza
(74) Attorney, Agent, or Firm—Liniak, Berenato, Longacre & White, LLC

(57) ABSTRACT

A method of manufacturing a hollow core door is disclosed, as well as a corresponding hollow core door. The method includes the steps of providing a solid flat door skin, moisturizing the flat skin, applying a conditioning resin thereto, pre-heating the flat door skin, and thereafter pressing the flat door skin between a pair of heated platens in a press in order to reform the flat skin into a molded skin including a plurality of panels defined therein. The press continuously closes in order to reform the flat skin into the molded skin, with the rate of press closure being a function of the determined hardness of the flat skin to be reformed. The resulting door skins have an improved bond strength, and are efficiently manufactured.

18 Claims, 5 Drawing Sheets

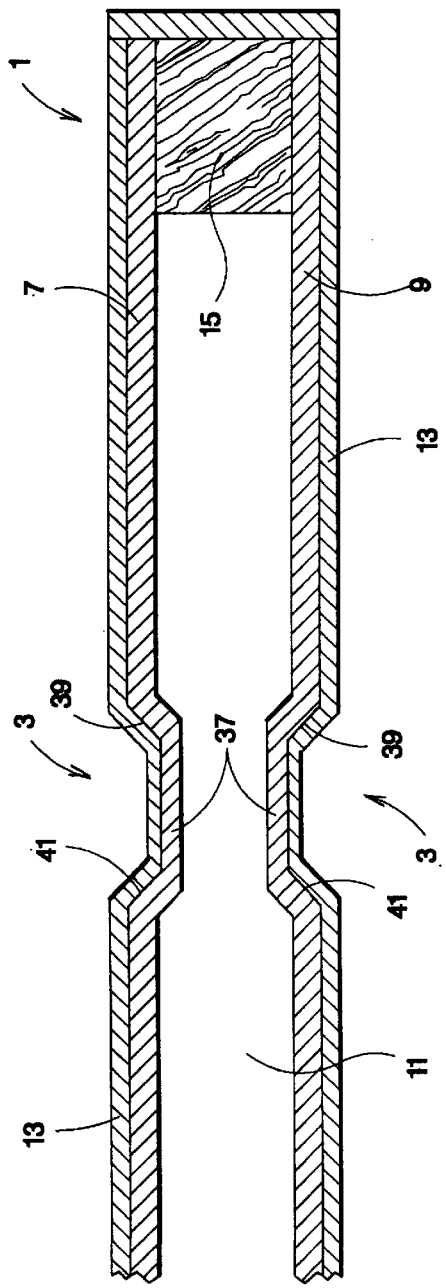
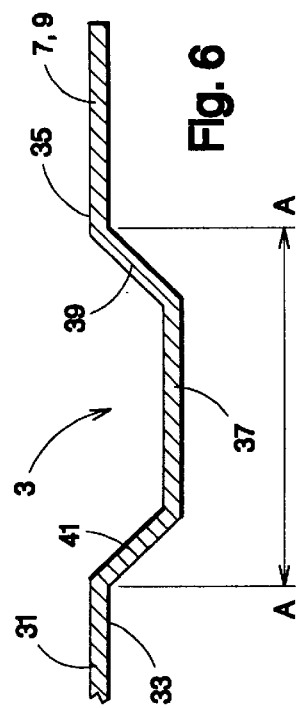
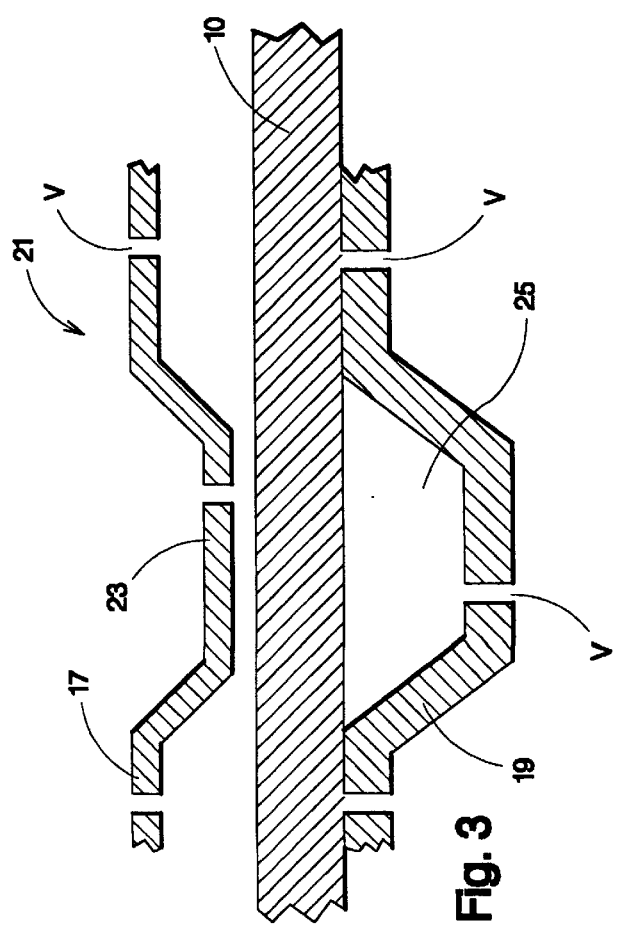

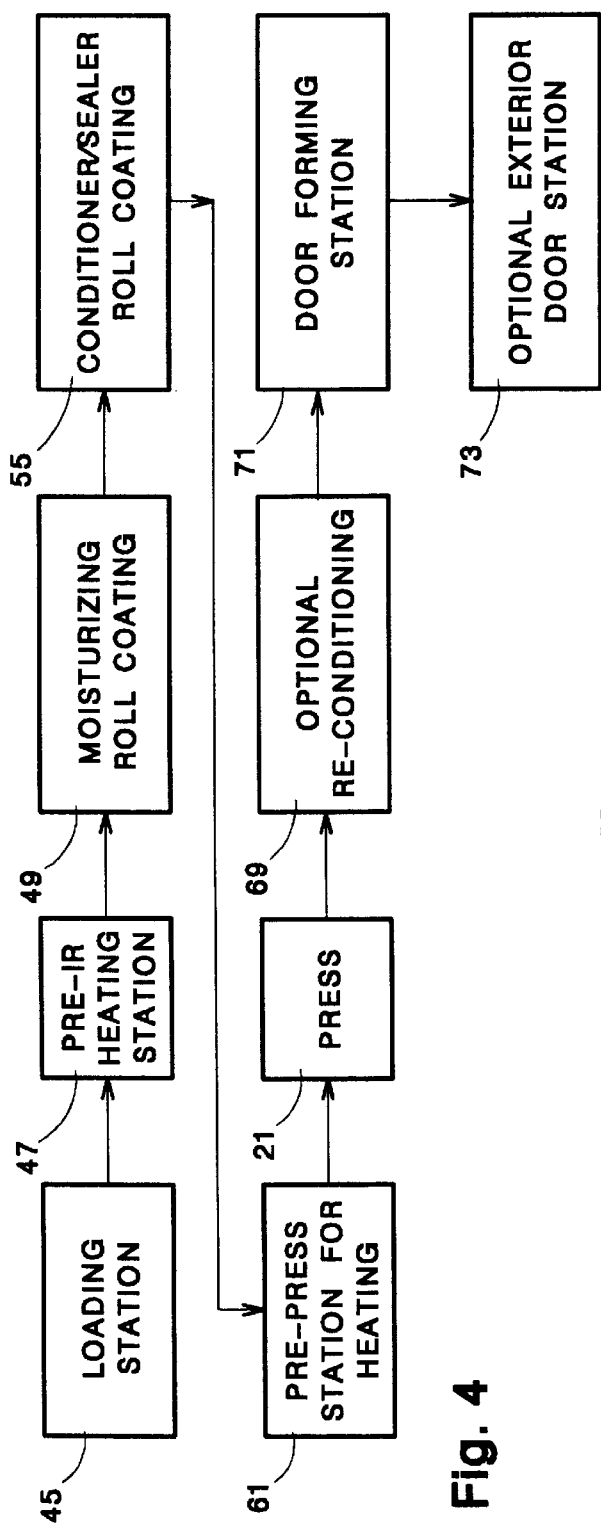
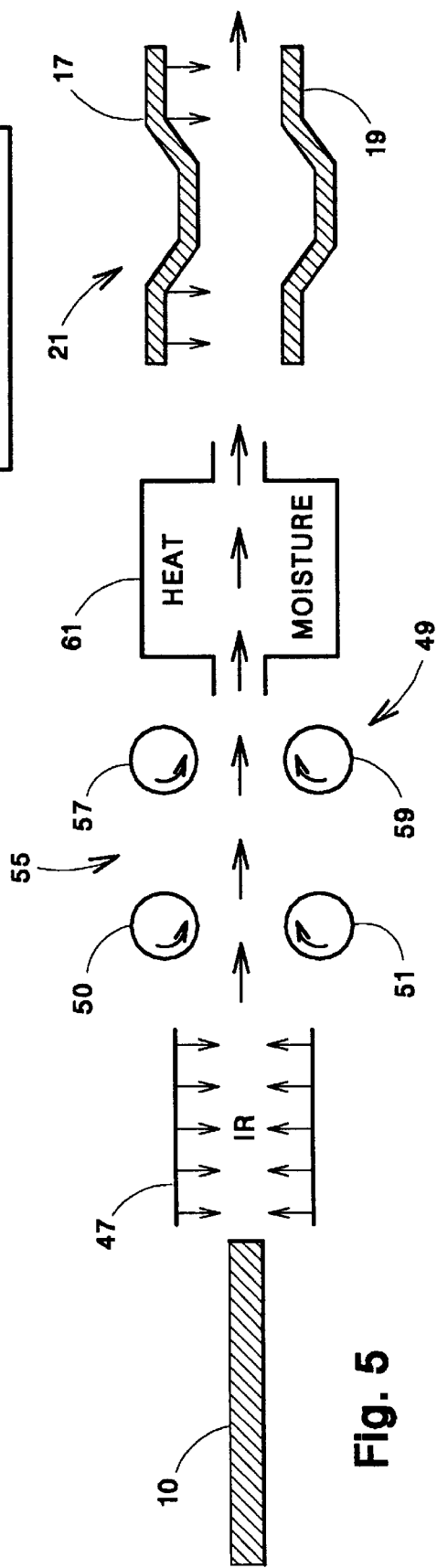
Fig. 4
Fig. 5

METHOD OF MANUFACTURING A MOLDED DOOR SKIN FROM A FLAT WOOD COMPOSITE, DOOR SKIN PRODUCED THEREFROM, AND DOOR MANUFACTURED THEREWITH

The disclosed invention is to a method for manufacturing a molded door skin from a solid flat wood composite material, as well as the resulting skin and a hollow core door produced therefrom. More particularly, the disclosed invention is to a method for manufacturing a molded door skin in which a flat or planar solid blank of wood composite material is pre-heated, moisturized, and heated in a press to a temperature sufficient to soften the blank and during which the press platen(s) are pressure actuated to close, with the closing pressure thereafter increased continuously to a preset limit in order to deform the blank into a molded configuration suitable for a door skin and ultimately for being assembled into a hollow core door.

Hollow core doors are used in both interior and exterior applications. Many hollow care doors are made from door skins formed from wood composite materials. These wood composite materials may include particle board, flake board, hard board, and medium density fiberboard ("MDF"). The wood composites often utilize a resin binder, which frequently is a thermal setting resin, in order to maintain the wood fibers forming the composite in solid form.

A hollow core door may be of the "flush" type, that is one that is flat or planar on both major surfaces (i.e. both door skins are flat and do not include panels molded therein). Alternatively, a hollow core door may be of the "molded" type, that is one having a series of three-dimensional panels or the like formed or molded into the skins as they are being manufactured.

Standard molded door skins are formed from a relatively thick non-solid mat or bat of material, which is thereafter compressed in a press to a relatively thin, final thickness. The mat can be produced from either dry or wet fibers. If the mat has a very high water content, with the result that water is squeezed out during the pressing operation. The press may be a multiple platen press, having a series of skin forming pockets. Because the mat is in a flexible state prior to the pressing operation, then the resulting solid skin has sharply defined features acceptable to consumers because the wood fibers can flow in order to conform to the mold. Due in part to the high captial costs involved to build plants to make molded skins, manufacturers frequently require that individual orders be for a large number of skins in order to permit maximum operating efficiencies. Smaller orders become cost prohibitive.

Flush door skins on the other hand may be made in a similar manner as moulded skins, except that the original mat or bat of wood fibers is pressed flat, and is not three-dimensionally molded to form panels or the like. Alternatively, a continuous belt press may be used for flat skins. Thus, a flush door skin originates from a relatively thick non-solid mat or bat of wood-like fibers, which is pressed into a planar or flat shape to define the flush solid skin. This means that standard medium density fiberboard, or hardboard may be used.

Standard molded door skins are relatively expensive, because the capital cost is quite high due to the need for dies, presses, and the like. The flat or planar skins used for flush doors, on the other hand, are relatively inexpensive, but do not provide the aesthetic features often desired by consumers.

Because of the cost differential between a wood composite "flush" or "flat" skin and a wood composite "molded" skin, attempts have been made to transform flush skins into molded skins in an effort to more inexpensively produced molded door products. Such prior efforts have not resulted in commercially acceptable door skins, principally because the appearance of the surface has typically not been satisfactory. Prior efforts to transform flush skins into molded skins have generally resulted in the final molded skin having a cracked, marred, or otherwise aesthetically displeasing configuration and/or appearance.

It is apparent from the above that there exists a need in the art for a method of manufacturing a molded door skin from a flat wood composite blank which permits a standard flush or flat skin blank to be used as the base material, and which results in a molded door skin having features and surface characteristics acceptable to consumers. Yet a further need in the art is a molded door manufactured from flat wood composite door skins, which has suitable resistance to moisture, so that the door may be used for exterior applications.

It is a purppose of this invention to fulfill the above-described needs in the art. In commonly owned U.K. Application No. 9707318.3), there is disclosed a method of making a hollow core door by reforming flush or flat door skins into molded skins via a press, wherein pressure applied to platens of the press is increased in a series of steps. It has been found that the method of the prior application can be improved upon, as set forth below, to enable more efficient flat skin shaping, and improved strength to the end product door.

The disclosed invention meets these and other needs in the art. It is a purpose of this invention to fulfill the above-described needs in the art.

A primary object of the disclosed invention is a method of manufacturing a molded door skin from a flush wood composite blank through applying continuously increasing pressure to a moistened and softened flat blank, so that the resulting skin has molded features and surface characteristics acceptable to consumers.

A further object of this invention is a molded door skin that is impervious to moisture, with the result that the door will not distort and therefore will be suitable for exterior applications.

A method of manufacturing a door skin, according to one aspect of the invention, comprises the steps of providing a solid wood composite flat blank (i.e. one that has already been compressed from its thick, loose, moisture-containing state). The blank is pre-heated and moisturized, coated with a sealer, and placed between platens of a heated press. The platen(s) are heated to a temperature sufficient to soften the resin in the blank and thus to soften the blank, sufficient pressure is applied to close the platens, and the pressure is continuously increased for thereby causing the blank to be deformed into a molded shape determined by the configuration of the platens. The rate of closure of the press is determined by, and is a function of a number of characteristics including, the hardness, density, density profile, depth of molding, and percentage binder or resin content of the flush skin blank being reformed. The molded and now reformed blank is then removed from between the press platens.

A door skin, according to another aspect of the invention, comprises a molded medium density fiberboard three-dimensional blank. The blank has a first portion with a first preselected thickness. The blank has a second portion with a second preselected thickness. The second thickness is less than the first thickness.

A door skin, according to a further aspect of the invention, comprises, after reforming in the press, a molded medium denisty fiber board three dimensional blank having a density of from about 550 to about 1,200 kg/m³, which density is substantially uniform throughout the thickness of the skin (i.e. plus/minus about 75 kg per cubic meter throughout the skin's thickness, preferably within about plus/minus 25 kg per cubic meter).

A door, according to a still further aspect of the invention, comprises a peripheral frame having oppositely disposed sides. At least a first molded skin is provided. The skin has first and second sides. The first or exterior side of the skin has a moisture impervious barrier applied wholly there about. The door skin second or interior side is secured to one of the frame sides. A second door skin is secured to the opposite side of the frame.

It is also an object of this invention to provide a door skin, that after reforming into a molded skin, is stronger than a standard flush or flat skin blank and a molded skin. In certain embodiments, the reformed molded skin has a bond strength of at least about 2.0 N/mm², and preferably a bond strength of at least about 2.5 N/mm². This can and is often double the internal bond after processing.

These and other objects and advantages of the invention will be readily apparent in view of the following description and drawings.

FIG. 2 is a fragmentary cross sectional view taken along line 2—2 of FIG. 1.

FIG. 3 is a fragmentary cross sectional view of a flat or flush door skin blank being positioned in a molding press in accordance with this invention, this Figure showing the flat or flush skin while still in its flat shape.

FIG. 4 is a schematic flow chart of a process used in manufacturing hollow core doors of FIGS. 1–2 in accordance with certain embodiments of this invention.

FIG. 5 is a schematic diagram illustrating a solid flat skin being fed toward an IR pre-heat station, moisturizing station, sealing statioin, pre-press station, and press station in the FIG. 4 process.

FIG. 6 is a cross sectional view of a reformed skin according to the FIGS. 1–5 embodiment of this invention.

In the accompanying drawings, like reference numerals indicate like parts throughout the several views.

Figure 1:
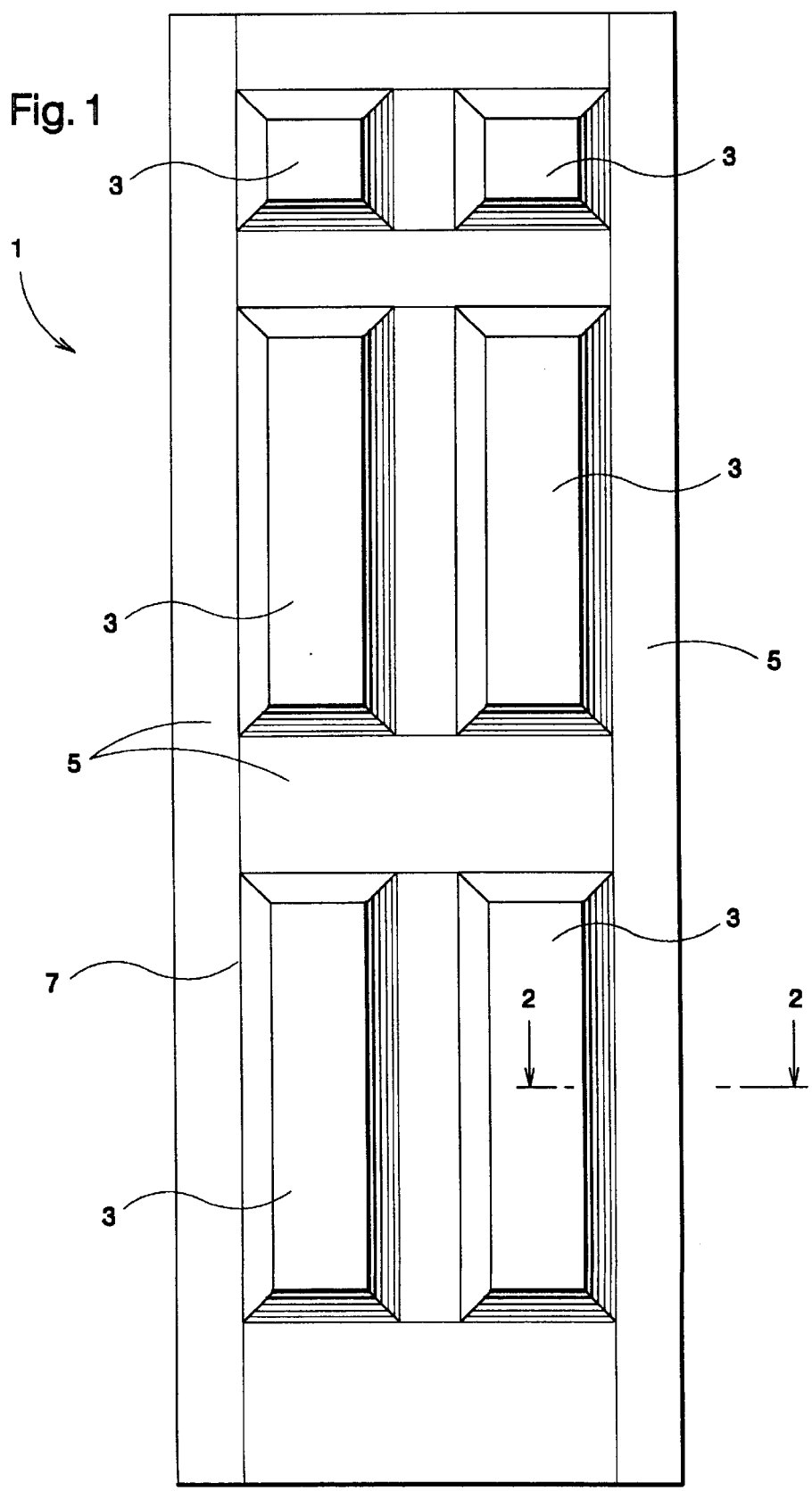
FIG. 1 is an elevational view of a hollow core door including a pair of opposed reformed skins (i.e. molded from flat skins) made in accordance with an embodiment of this invention.

Hollow core door 1, as best shown in FIGS. 1 and 2, according to embodiments of this invention is efficiently made to aesthetically resemble standard molded hollow core doors which are themselves made to resemble a traditional method of solid wood doors made from stiles rails and panels. In accordance with this invention, door skins 7, 9 of door 1 are not molded directly from non-solid mats or bats to form three-dimensional molded panels 3 as in standard molded door manufacturing. Instead, flush (i.e. flat or planar) solid composite skins 10, as best shown in FIG. 3, that have already been pressed into their compressed rectangular flat-skin shape are provided, pre-heated, moistened, sealed, and then reformed in a platen inclusive mold press in order to result in reformed molded skins 7, 9, each of which has panels 3. Reformed molded skins 7, 9 are used to manufacture hollow core door 1.

By reforming flat pressed blanks 10 in such a manner, the prior door skin moulding procedure (e.g. with dies, presses and the like that take non-solid bats and press them into molded skins) is avoided. Thus, molded doors 1 can be made more effieiently and cost effectively, and the resulting door skins may have a strength of more than twice that of standard molded skins, and more than twice that of standard flush or flat skin blanks. Standard molded skins from Masonite Corporation, for example, typically have a bond strength of about 1.4 N/mm², while reformed skins 7, 9 according to certain embodiments of this invention preferably have a bond strength of at least about 2.0 N/mm², and most preferably a bond strength of at least about 2.5 N/mm².

In accordance with certain embodiments of this invention, it has also been found important to control the rate of closure of platen(s) 17, 19 of press 21, as best shown in FIG. 3, as a function of the hardness, density, density profile, depth of molding, and percentage binder or resin content of the blanks 10 to be reformed, and to continuously apply increasing pressure, in a non-stepped manner or progressively smooth application, to platen(s) 17, 19 in press 21 as blank 10 is being reformed. It has been found that the continual increase in pressure, with the rate of closure being controlled as a function of blank 10 material composition, results in a more efficiently reformed skin 7, 9 with less surface cracking, and enables the wood fibers of flat skin 10 to flow more easily during reforming to their new positions in skins 7, 9.

Surprisingly, it has also been found that adding conditioning resins (e.g. melamine or urea formaldehyde thermal curing resins) to solid blank 10 prior to pressing, results in a stronger end product skin 7, 9 and a more aesthetically pleasing reformed skin 7, 9. It has been found that the addition of these resins allows the stretched or broken internal bonds, created when deforming the boards actually repairs these fibers and eventually reforms bonds stronger than were originally evident. The quantity of these resins can be varied to suit the final performance of the product requirements in terms of moisture resistance and internal bond strength.

Referring to FIGS. 1–2, hollow core door 1 appears to be of the standard molded type, but in reality is not. Door 1 is made using pressed flush or flat blanks 10, that are reformed in accordance with certain embodiments of this invention to form molded skins 7 and 9 having panels 3. Door 1, on each major surface thereof, includes a plurality of three dimensionally formed panels 3 and corresponding raised planar portions 5. Door 1 includes a pair of opposing reformed skins 7 and 9 (that aesthetically resemble conventionally molded skins) which define hollow core area 11 there between. In interior door applications (e.g. FIG. 1), skins 7 and 9 of door 1 represent the outer major surfaces of door 1, while in exterior door applications (e.g. FIG. 2), melamine impregnated crepe paper or phenolic resin crepe paper 13 may be disposed entirely or wholly about the exterior surface of each skin 7 and 9. Paper 13 provides a moisture impervious barrier minimizing water absorption by door 1.

Referring still to FIGS. 1–2, reformed skins 7 and 9 of door 1 are adhesively secured to door frame 15, such as with polyvinyl acetate ("PVA"). Those skilled in the art will recognize that frame 15 extends about the periphery of rectangular reformed skins 7 and 9 and door 1, and typically includes two parallel wooden stiles extending along longitudinal edges of the door and two parallel wooden rails at the bottom and top of the door. Skins 7 and 9 are spaced apart from one another by frame 15 to form hollow core area 11 which can be filled with foam or the like.

FIG. 3, which will be described in further detail below, illustrates solid blank skin 10 as it is placed between platens 17 and 19 of mold press 21. Blank 10 was previously formed, as known in the art, into the illustrated flush or flat blank 10. Typically, blank 10 is formed by pressing a relatively thick, non-solid wood fiber mat or bat into a solid flat door skin 10 having no panels molded therein. At press 21, flat blank (or flat skin blanks) 10 is reformed into molded skins 7 and 9, which each include panels 3 molded thereinto. At press 21, bottom platen 19 may remain fixed in place as to position, and upper platen 17 may move vertically with respect to platen 19 in order to open and close the press, respectively. In such a manner, when platen 17 is moved downward to apply pressure on blank 10, male protrusions 23 (each of which corresponds to a panel 3 to be formed) mate with corresponding female recesses 25, with blank 10 there between, so as to reform flat blank 10 into molded skin 7, 9 having panels 3 defined therein. FIG. 6 illustrates a reformed skin 7, 9, having a panel 3 defined therein, after leaving press 21. In sum, press 21 reforms flat blanks 10 so as to mold a plurality of panels 3 thereinto.

Still referring to FIG. 6, after reforming in press 21, each skin 7, 9 has opposed surfaces 31 and 33 formed of surfaces of the reformed skin. Each skin has planar first portion 35 and planar second portion 37. Portion 37, together with angled offset portions 39 and 41, form a panel 3 in the reformed skin. Offset portions 39 and 41 preferably have a configuration facilitating removal of the skin 7, 9 from the platens of press 21 upon conclusion of the reforming process. Portions 35, 37, 39, and 41 have different thickness in certain embodiments due to stretching and wood fiber flowing processes reforming blank 10 in the press. For example, with a blank 10 having a nominal thickness of between 2.5 mm and 5 mm, more preferably between 3.0 mm to 3.5 mm, first portion 35 and portion 37 of the reformed skin may have a reduction of about 10% from its original thickness of slightly less than 4 mm, while offset portions 39 and 41 have a thickness of from about 2.5 to 3.5 mm (preferably about 3.0 mm). In certain other embodiments, portions 35, 37, 39, and 41 may all have substantially the same thickness.

The manufacturing process described below enables reformed skins 7, 9 to be made from solid pressed flat blanks 10 with the resulting skins 7, 9 being aesthetically pleasing, cost effective to make, substantially free of surface cracks, and substanially unmarred.

Figure 10:
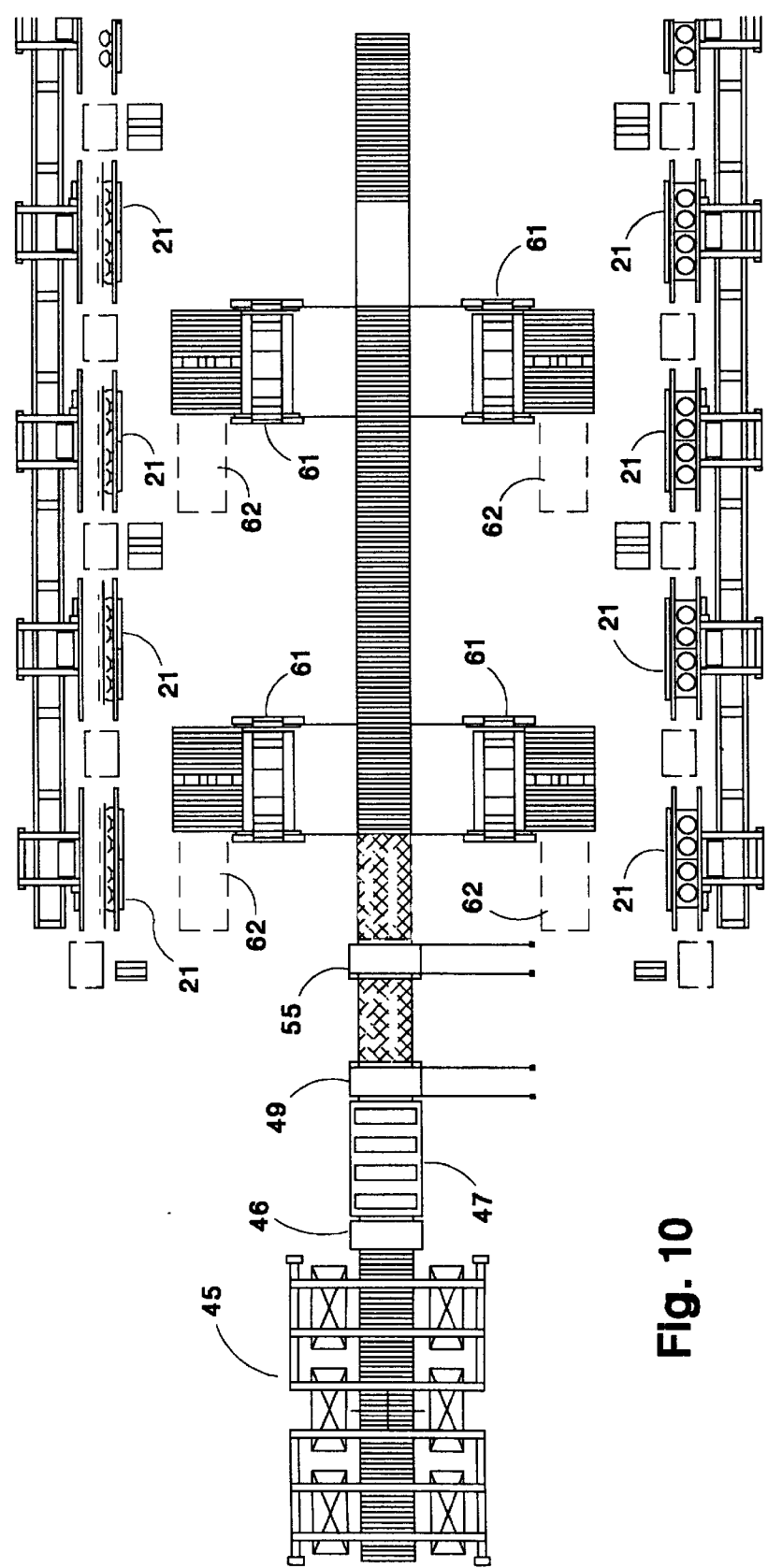
FIG. 10 is a schematic flow chart of a process and apparatus used in manufacturing doors of FIGS. 1–9 according to an embodiment of this invention.

Referring now to FIGS. 4–5 and 10, solid and already pressed flush/flat door blank 10 is provided. Flat blank 10 is preferably a wood composite, such as medium density fiber (MDF) board or hard board, bound together with thermal setting resin(s). MDF frequently has urea formaldehyde resin as the binder, which resin can be molded at temperatures of between 320° F. to about 425° F. MDF solid flat door skin blanks 10 are available in various thicknesses and weights, ranging from about 3 mm to 7 mm. In certain preferred embodiments, blank 10 is in the upper thickness range, so as to provide sufficient wood fiber for providing sharp and well defined features and to prevent surface cracking at transition areas. However, any thickness from about 3 to 7 mm will suffice.

Solid flat blank 10 is received at loading station 45. Blank 10 has a density of at least about 550 kg/m$^3$, preferably from about 750 to 850 kg/m$^3$, and a thickness of from about 3 to 7 mm. Blank 10 has an initial weight of from about 340–600 grams (gms). Blank 10 has an initial moisture content of from about 7–9%, preferably about 8% by weight. Typically all of the resin (e.g. melamine or urea formaldehyde) binder in blank 10 is not cured, because over curing can cause brittleness. Hence, manufacturers cure the blank 10 sufficient to attain hardness specifications, leaving some resin uncured. From about 5–20% (sometimes from about 10–15%) of the resin in flat blank 10 is uncured or undercured. The 5–20% uncured resin in flush blank 10 will later be cured in the disclosed reforming process, with the result that reformed skins 7 and 9 attain a significantly higher hardness than is currently available with other molded skins.

Optionally, blank 10 may be brushed clean at cleaning station 46 (see FIG. 10) in order to remove dirt, dust, and other potential surface contaminants.

Referring to FIGS. 4–5, blank 10 is then forwarded to infrared (IR) pre-heating station 47, which preheats skin 10 using IR radiation or any efficient means of raising board temperatures. The IR preheater 47 preferably has a series of uppper and lower banks of IR lamps, between which blank 10 is positioned. The outputs of the IR banks are independently controllably, in order to account for blanks 10 of differing thickness, composition, etc., so that the blanks 10 are not heated too high. Preheating to a temperature of about 80° to 100° C. begins the initial preparation of the blank 10 and enhances the ability to accept added moisture (e.g. steam, spray, or direct roller coating). Pre-heating station 47 causes blank 10 to lose from about 3–15 grams of weight, as blank 10 is preheated for about 25–125 seconds, preferably for about 30–90 seconds. Blank 10 leaves pre-heater 47 with a moisture content of about 5–7%. Station 47 preheats at least a surface of the blank to a temperature of at least about 80° C.

Pre-heated flat blank 10 is then forwarded to moisturizing direct roll coating station 49. Rolls 50 and/or 51, as best shown in FIG. 5, at station 49 rotationally contact the skin and apply a coating of moisture (e.g. water or the like) to at least one major surface (and possibly two in some embodiments) of blank 10. The moisture content of the blank is thus caused to increase to about 9–15%, preferably about 10–12%. Blank 10 is maintained at a temperature of from about 80° to 100° C. during moisturizing so as to be receptive to the added moisture. In certain embodiments, roll 50 is a non-moisturized press roll, while roll 51 applies moisture to blank 10. Moisturizer (e.g. water) which may contain a surfactant to aid moisture absorption may be applied to one or both major surfaces of blank 10, in an amount of from about 60–290 grams per square meter, most preferably from about 80–120 grams per square meter. According to an alternative embodiment of this invention, steam may be directed at blank 10 at station 49 in order to add moisture to the flat solid blank 10.

In certain embodiments, major surface(s) of blank 10 may be sanded prior to moisturizing, in ordere to facilitate efficient increase in moisture content of the blank via more efficient moisture absorption throught the surface. Sanding removes the material at the surface of blank 10, with the surface typically having a cured resin content exceeding the cured resin content of the interior. Removal of the surface resin facilitates moisture transmission into blank 10.

Moisturized blank 10 is then forwarded to double roll coater 55. Rolls 57 and 59 contact blank 10 and apply conditioning resin and possibly also pigmented sealer to flat blank 10. The applied resin and sealer increase the moisture content of blank 10 to about 12–14% by weight. The conditioning resin may include water, with an additive of from about 5–20% by weight of melamine or urea resin. From about 20–200 grams/m$^2$ of conditioning resin is applied to blank 10 at station 55. Thus, while blank 10 already has some resin maintaining the wood fibers in solid form and also uncured resin, additional resin is added at station 55. The added resin improves the ability of blank 10 to be efficiently reformed, while also providing increased hardness to the resulting molded skin. Surprisingly, should the resin originally present in blank 10 be melamine-based, either melamine or urea resins can be added at station 55, or should the resin origianlly in blank 10 be urea-based, also either urea or melamine resins can be added at station 55. The temperature of blank 10 at station 55 is such that the resins do not yet begin to react or cure. In certain embodiments, roll 59 applies the conditioning resin to blank 10, while roll 57 applies a color-pigmented seal coating.

Pigmented sealer (for example, having titanium dixoide pigment to provide a white or alternative color), applied at station 55 by e.g. roll 57, creates a uniform colored surface on the reformed skin. Preferably, the pigmented sealer is applied to what is to be the exterior surface of the skin. The pigmented sealer thus causes the resulting skin to be primed. Doors formed from prior molded skins need to be primed, thus adding cost. Approximately 4–10 gms/m$^2$ of pigmented sealer can be applied to blank 10 at station 55 by top roll 57.

After the color-pigmented sealer and additional resin have been applied at station 55, flat blank 10 is forwarded to pre-press station 61 for additional heating. Blank 10 is maintained at station 61 for a time period of from about 20–60 seconds (preferably about 30 seconds) at a temperature from about 110–130° C. (preferably about 120° C.). Pre-press station 61 has a confined volume, so that the moisture in blank 10 does not readily evaporate into the atmosphere. The moisture remains in the blank as its temperature is increased. Station 61 is closed. so that moisture in blank 10 cannot readily escape blank 10. Pre-press station 61 may be formed from spaced, opposed oil or electric heated platens, between which blank 10 is positioned.

For exterior door applications, after blank 10 leaves pre-press station 61, it is forwarded to barrier applying station 62, as best shown in FIG. 10. At station 62, a barrier, such as melamine impregnated crepe paper or phenolic resin crepe paper 13, is applied to the major surface of blank 10 that will be the exterior door skin surface (i.e. face away from the door's interior). A suitable paper may be purchased from Akzo Nobel under their name SWEDOTEC™ flexible primer films TGPN and TXP. Alternatively, a cross linking polymeric resin system, forming a moisture barrier, may be applied at station 62 as a two component liguid sprayed or otherwise applied to the surface of the blank 10. The moisture impervious barrier (e.g. crepe paper or cross-linked resin) also increases the hardness of the resulting skin, and provides abrasion resistance that is beneficial during shipping and installation. After the barrier 13 has been applied, the blank 10 is forwarded to press 21.

In interior door applications, after blank 10 has been pre-heated and optionally further moisturized at pre-press station 61, flat blank 10 is forwarded to press 21, which has upper platen 17 and stationary lower platen 19.

Press 21 is heated, preferably by recirculating oil or electric resistance elements, with platens 17 and 19 being heated to a temperature sufficient to prepare the resin in the blank 10, and to thereby prepare the blank. Press 21, as noted, may be vented, preferably via small vent holes v, as best shown in FIG. 3. The bottom platen is vented in order to release steam, volatiles, and similar gaseous products generated during the pressing operation. Surprisingly, it has been found that venting the press 21 results in a stronger end product skin than does intermitten venting of the press. The holes v are sufficiently small in diameter to preclude wood fibers from blocking them and/or marring the resulting uderside surface.

At press 21, flat blank 10 is placed between platens 17 and 19, as best shown in FIG. 3. Platen 19 remains still or fixed in place, and pressure is applied to upper platen 17 in order to force platen 17 downward toward platen 19. As platen 17 is urged toward platen 19, balnk 10 is reformed in conformance with the shape defined by the interface of the platents 17 and 19 and their corresponding elements 23 and 25 (e.g. in the shape of a panel 3).

In alternative embodiments, both platens may be simultaneously moved toward one another, or the bottom platen 19 may be moved upward toward platen 17 which may be fixed.

Figure 7:
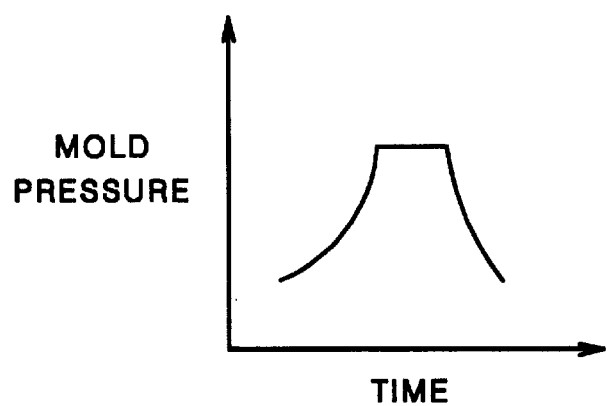
FIG. 7 is a mold pressure versus time graph according to an embodiment of this invention as per FIGS. 4–5, illustrating how pressure is continuously applied to the press platen(s) during pressing (reforming) of the flat skin, with the platens then being maintained at a constant pressure, and after which a downward slope indicates the platen(s) pressure being released for thereby opening the press.

As best shown in FIG. 7, the pressure applied to the platen(s) to close press 21 (e.g. the pressure applied to platen 17) is uninterruptedly increased (see upward sloping portion 63) to a preset limit of pressure and or physical stops to control thickness. The applied pressure 63 (which may be applied continuously and monotonically and/or in a linear manner in some embodiments) causes platen(s) 17 and 19 to close relatively slowly by as little as 0.25 mm per second with some material. Blank 10 is correspondingly relatively slowly reformed, until the configuration of FIG. 6 is achieved and press 21 closed. When the press 21 is closed, the platens 17 and 19 are held at the pressure 65 of FIG. 7 in the closed position, preferably for a period of from about 10–60 seconds, most preferably from about 20 to 30 seconds. During the holding step, the wood fiber in the blank 10 continues to flow while the blank 10 achieves its final configuration. In addition, the resin, both the original uncured resin and resin added with the conditioner, begins to react and cure. Curing the resins causes them to harden; thus solidifying the reformed blank 10 into skin 7. The plateau or substantially planar pressure portion 65 of FIG. 7 graph illustrates the substantially constant pressure applied to the platen(s) of the press 21 during holding or cure time. Then, after this curing time has elasped, press 21 is opened along 67, e.g. by lifting platen 17 upward, so that reformed door skin 7, 9 can be removed therefrom. In FIG. 7, the downward sloping pressure portion 67 illustrates the opening of press 21. Preferably, pressure portion 67 in FIG. 7 slopes at a much greater angle than does portion 63, indicating that the pressure release during opening is much quicker than the pressure application during press closing.

During pressure portion 65, when peak pressure is being applied to the blank 10 via the platens, as much as 1200 pounds per square inch of pressure may be applied, although this substantially constant pressure is preferred to be from about 600 to 900 pounds per square inch, and most preferably about 750 pounds per square inch. Platens 17 and 19 are each preferably a hard chrome plated steel die, preferably having a Rockwell hardness of 60 to 70 or greater. The surfaces of the platens have the hard chrome plating in order to resist accumulation of wood sugars, which otherwise might occur. Each platen is preferably from about 3–5 inches thick, preferably about 4 inches, with each platen being electrically heated, such as by a Kalrod, although oil circulation or steam circulation may be acceptable heat media in certain embodiments. Platens 17 and 19 are preferably mirror images of one another, with one being male and the other female. Preferably, each platen 17, 19 is maintained at a temperature of from about 320–425° F., and most preferably from about 370–380° F., although this may vary by fiber and resin type, during the pressing process. The selected temperature, which is a function of the resins and the blank 10 thickness, should be maintained throughout the pressing operation during which flat blank 10 is reformed, in order to assure that the binding resin in the blank melts/remelts and remains flowable during the pressure application portion 63.

Figure 9:
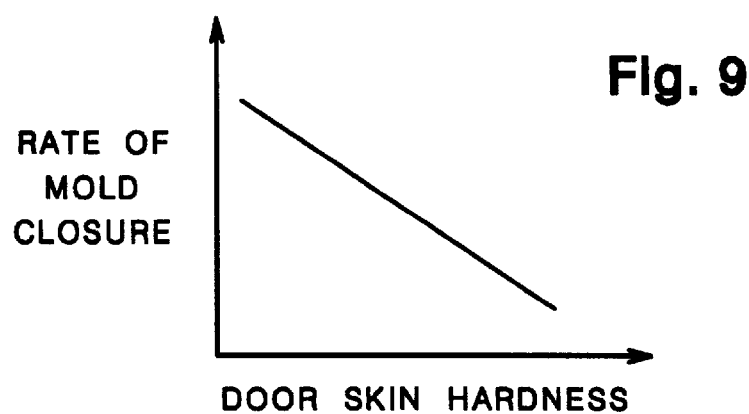
FIG. 9 is a graph according to an embodiment of this invention, illustrating the rate of press mold platen closure as a function of the hardness of the pressed solid flat door skin to be reformed.

As best shown in FIG. 9, it has been found that for optimum reforming, the rate of press 21 closure should be controlled as a function of at least one of the hardness density, density profile, depth of molding, and percentage binder or resin content characteristic of the blank 10 being reformed. The harder the blank 10, the slower the press 21 closure rate. The closure rate of the press 21 is substantially constant in certain embodiments, and depending upon the hardness of the blank 10, the closure rate may vary from about 0.25 mm/second to 1.0 mm/second. It has been found that if press 21 closes too quickly, resin bonds within the blank 10 can break. Thus, the harder the solid blank 10, the slower the heated platens should close, in order to avoid substantial resin bond breaks during reforming.

When press 21 opens, and the reformed skin is removed, the result is the door skin 7, 9 illustrated in FIG. 6, each having a plurality of panels 3 formed or molded therein as shown in FIG. 1. Those skilled in the art will recognize that features other than panels 3 may be molded into the skin.

Figure 8:
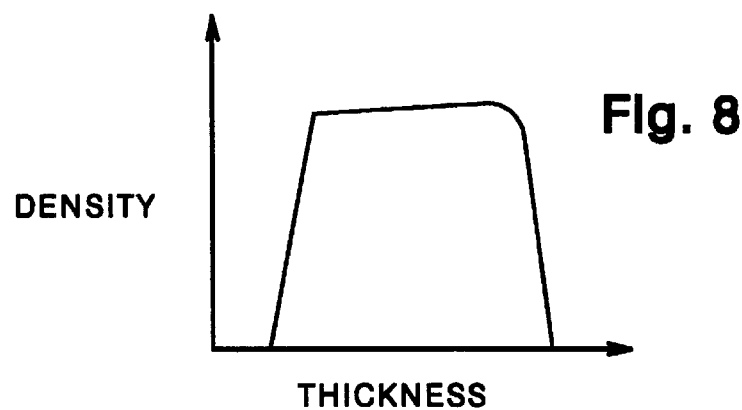
FIG. 8 is a graph illustrating how, in certain embodiments of this invention; each reformed skin has a substantially constant density through the entire thickness of the reformed skin.

FIG. 8 illustrates that reformed skin 7, 9 has a substantially constant density throughout its thickness. This is a byproduct of the unique method of manufacture described above. The density of skin 7, 9 throughout substantially its entire thickness is preferably from about 800 to 1,200 kg/m$^3$, but higher than the density of original flush blank 10 by around 10%.

Referring to FIG. 4, from press 21, the reformed molded skins 7, 9 may be forwarded to optional reconditioning station 69, where the skins are remoistened to a moisture content of about 8% (if they were below that after leaving the press). Trimming may also be performed at station 69 after remoisturizing. Remoistening at station 69 may be achieved by water misting or the like, or by passing the reformed skin through a water bath. Priming is not necessary, if the pigmented sealer applied at station 55 or pigmented pre press sealers are used. On all other applications priming is preferred. Once reconditioned, which is optional, skins 7, 9 are forwarded to door forming station 71, at which each skin is adhesively secured to a door frame, preferably a wooden frame, in order to form a hollow core door 1. Should the door be an exterior door, then a further moisture impervious barrier may be applied at station 73 to the exposed edges of the frame by edge banding or painting. Those skilled in the art will recognize that the door 1 need only have one molded skin 7 or 9, and that the opposite side may be flat.

The final door 1 is shown in FIGS. 1–2 as described above, with crepe paper 13 being used only in exterior door applications.

FIG. 10 illustrates an assembly line for carrying out the method described above. There are two presses 21, each having a pre-press station 61. This is because, in full operation, presses 21 operate slower than their corresponding pre-press stations 61. Furthermore, for each loading station 45, moisturizing station 49, and sealing/conditioning station 55, etc., there may be a plurality of pre-press stations 61, each of which then has two presses 21. Consequently, the assembly line of FIG. 10 is readily expandable; substantially reducing the initial capital costs required to produce in quantity door skins.

What is claimed is:

1. A method of manufacturing a hollow core door, the method comprising the steps of:

providing a solid wood composite flat blank having a density of at least about 550 kg/m$^3$ wherein said solid wood composite flat blank has already been compressed from a thick, loose, moisture containing state;

moisturizing the flat blank to raise its moisture content;

applying a liquid conditioning thermal curable resin to at least one major surface of the flat blank;

pre-heating at least a surface of the flat blank to a temperature of at least about 80° C.;

after said pre-heating step has been performed, positioning the flat blank into a press between first and second platens, at least one of the platens being heated;

reforming the flat blank into a molded door skin including a plurality of panels defined therein by closing the press;

degassing the flat blank being reformed by evacuation of volatile components from the press; and affixing at least a first molded door skin to a first side of a door frame and affixing a door skin to an opposite second side of the door frame.

2. The method of claim 1, wherein the density of the flat blank, prior to said pressing step, is from about 500 to 1,200 kg/m$^3$.

3. The method of claim 1, wherein the bond strength of the flat blank prior to said pressing step is less than about 2.0 N/mm$^2$, and wherein the bond strength of the molded door skin after said pressing step is at least about 2.0 N/mm$^2$ so that said pressing step in combination with at least said applying a conditioning resin step increases the bond strength of the molded door skin.

4. The method of claim 1, wherein said pressing step closes the press at a rate at least about 0.25 mm per second.

5. The method of claim 1, further comprising the steps of:

determining at least one of the following parameters of the flat blank, the hardness, density, density profile, depth of molding, and percentage binder or resin content of the flat blank; and closing the press at a predetermined closing rate that in advance is determined by and is a function of the determined parameter of the flat blank.

6. The method of claim 1, wherein in said closing step, pressure applied in closing the press is uninterruptedly increased until the press reaches a closed position where the flat blank therein is in the form of the molded door skin having the plurality of panels defined therein.

7. The method of claim 1, further including the step of applying a pigmented sealer to the flat blank prior to said pressing step.

8. The method of claim 7, applying the sealer to the flat blank in an amount from about 4–10 g/m$^2$.

9. The method of claim 1, wherein said applying a conditioning resin step is performed so as to apply the resin to a surface of the flat blank in an amount of from about 20–200 gm/m$^2$.

10. The method of claim 1, wherein said steps are performed in the order in which they are recited.

11. The method of claim 1, wherein the molded door skin has a bond strength of at least about 2.5 N/mm².

12. The method of claim 1, wherein the resin applied to the flat blank in said applying step includes one of urea formaldehyde resin and melamine formaldehyde resin.

13. The method of claim 1, wherein said pre-heating step is performed prior to said moisturizing step.

14. The method of claim 1, further including the step of positioning the flat blank in a pre-press area prior to said pressing step, and while the flat blank is in the pre-press area performing said pre-heating step and simultaneously applying a moisturizer to the flat blank.

15. The method of claim 1, wherein in said pressing step the first platen remains stationary and the second platen is urged toward the first platen in order to reform the blank positioned in the press.

16. The method of claim 1, wherein the molded door skin has a substantially constant density of from about 800–1200 kg/m³, and wherein the density of the molded door skin is higher than the density of the flat blank from which it is formed.

17. A method of making a hollow core door, comprising the steps of: providing a solid flat skin wood composite blank wherein said solid flat skin wood composite blank has already been compressed from a thick, loose, moisture-containing state;

placing the blank between first and second platens of a heated press, the platens being heated to a temperature sufficient to soften the resin in the blank and to thereby soften the blank;

closing the press by continuously moving at least one of the platings toward the other platen until the press attains a closed position and the blank therein has been reformed into a molded door skin having a plurality of panels defined therein;

degassing the blank being reformed by evacuation of volatile components from the press allowing thermal activated resin in the molded door skin to cure;

removing the reformed blank from the press; and attaching a pair of reformed molded skins to a door frame to form a hollow core door.

18. A method of making a molded door skin, the method comprising the steps of:

providing a flat solid wood composite blank having a density of at least about 550 kg/m³ wherein said flat solid wood composite blank has already been compressed from a thick, loose, moisture containing state;

applying liquid thermal actuatable resin to the flat blank;

positioning the flat blank in a press having first and second platens;

heating the first and second platens each to a temperature of at least about 320–425° F.;

closing the press at a predetermined closure rate so as to reform the flat blank into a door skin including a plurality of panels molded therein;

degassing the flat blank being reformed by evacuation of volatile components from the press; and allowing the resin in the reformed door skin to cure for thereby forming a molded door skin.

* * * * *